United States Patent [19]

Souza

[11] 4,000,578
[45] Jan. 4, 1977

[54] TRIGGER-ASSEMBLY FOR ROTATING-FRAME TYPE ANIMAL TRAPS

[75] Inventor: Anthony J. Souza, Lititz, Pa.
[73] Assignee: Woodstream Corporation, Lititz, Pa.
[22] Filed: Feb. 3, 1976
[21] Appl. No.: 654,768
[52] U.S. Cl. .................................................. 43/92
[51] Int. Cl.² .................................... A01M 23/26
[58] Field of Search ........................ 43/92, 93, 90

[56] References Cited

UNITED STATES PATENTS

| | | | |
|---|---|---|---|
| 2,333,828 | 11/1943 | Taylor | 43/92 |
| 2,947,107 | 8/1960 | Lehn | 43/92 |
| 3,010,245 | 11/1961 | Conibear | 43/90 |
| 3,146,545 | 9/1964 | Frost | 43/90 |

Primary Examiner—Hugh R. Chamblee
Assistant Examiner—Daniel J. Leach
Attorney, Agent, or Firm—Holman & Stern

[57] ABSTRACT

A trigger assembly for the use in animal trap assemblies, in which the trap generally comprises rotating-frame type traps of the "Conibear" type, for example, which includes forcibly urged, mutually pivoted similar frame members and sides of which are pivoted against actuator means from a "set" position towards a "closed" position, and in which the trigger assembly generally defines an animal "run" having approaches from opposite sides, and which the trigger assembly comprises a plate member intermediately pivoted and operatively associated with exposable abutment means so that the mutually pivoted similar frame members of the trap will be dislodged from a "set" position due to a slight downward pressure on a lever-forming portion of the plate member when an animal approaches from either of the opposite sides of the animal "run" defined by the trap.

8 Claims, 5 Drawing Figures

U.S. Patent  Jan. 4, 1977  4,000,578
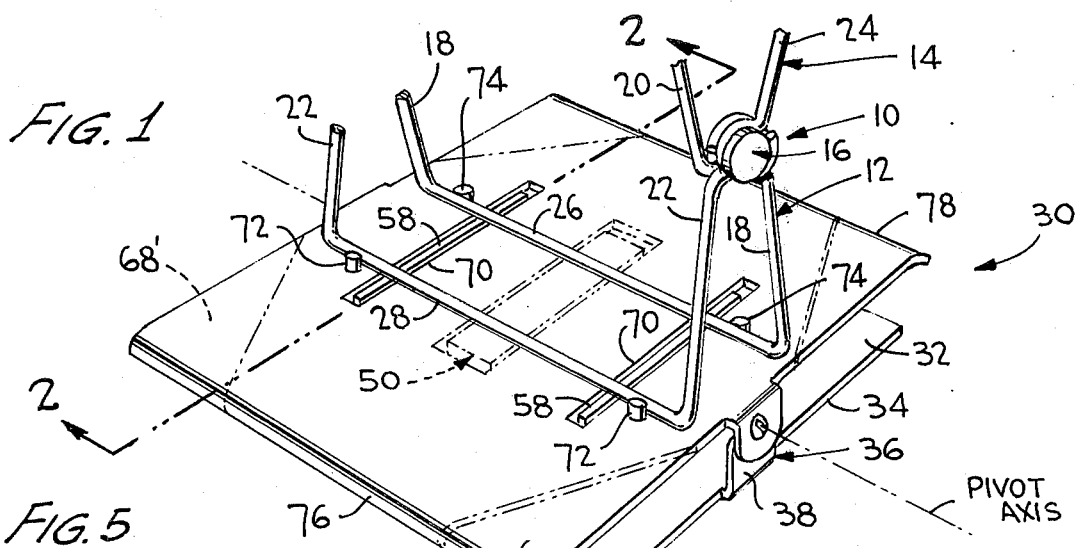
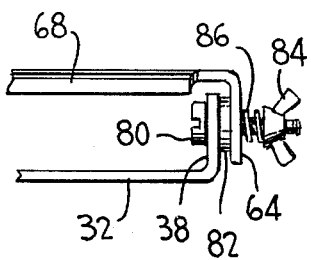
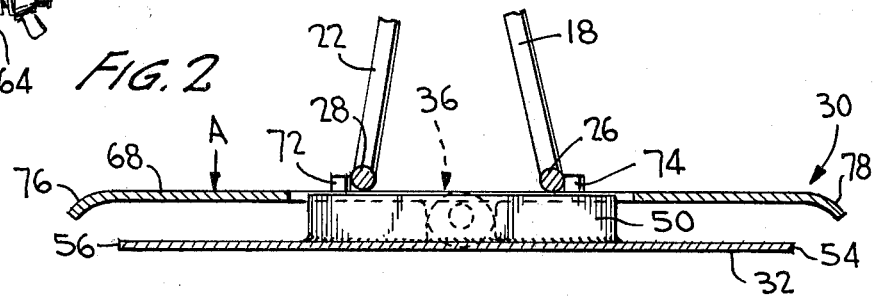
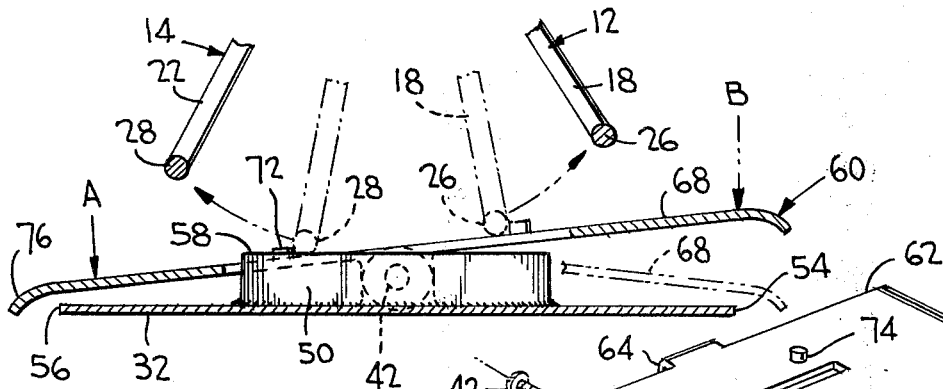

TRIGGER-ASSEMBLY FOR ROTATING-FRAME TYPE ANIMAL TRAPS

CROSS-REFERENCE TO RELATED APPLICATION

This application is related to copending application Ser. No. 615,672, filed Sept. 22, 1975, commonly assigned herewith.

FIELD OF THE INVENTION

This invention relates particularly to improvements in the actuating or foot-tread trigger mechanism used with all types of rotating-frame type traps. By a "rotating-frame type trap", applicant refers to the trap which is sometimes recognized as the "Conibear" trap, for example, in which a pair of similar frames, which may be generally square, rectangular or trapezoidal shaped, and pivotally connected at adjacent sides for relative rotation on a common axis to form their pairs of sides and pairs of co-acting jaws. At least one actuator, consisting of a coil spring, for example, having arms terminating in closed rings, has the ring slidable along and encircling one set of adjacent sides of the frames, and it is this actuator that is used to forcibly urge the jaws toward each other when the trap is sprung, and it is the actuator that maintains these traps in a "closed", "set", or locked condition. In the U.S. Pat. No. to Conibear, 3,010,245, dated Nov. 28, 1961, such a "rotating-frame type trap" is described in which the sides cooperate with the rings in a shape so that in the "set" position of the trap, the sides lie substantially parallel to each other, while the central portions of the sides, near the common axis of the frame, form a cross with each other within the rings on the arms of the coil spring or actuator. Another trap mechanism of the character involved is that disclosed in detail in the patents to Conibear U.S. Pat. Nos. 3,762,097; 3,760,531 or 3,797,162, for example.

A trigger means for example as described in the U.S. Pat. No. to Conibear 3,010,245 or in the U.S. Pat. No. to Lehn 2,947,107, maintains the frames in an open position when the trap is "set", but when the trap is sprung, releases the frames so as to permit, as the result of the action of the spring and the rings on the ends, rapid rotation of the frames to an angle of about 90°, so the jaws quickly strike and rapidly and humanely kill the animal in the trap.

A standard commercial trigger mechanism presently associated with rotating traps is described in the above-mentioned patent to Lehn. Essentially, this patent describes a trigger mechanism comprising two prongs adapted to project inwardly toward the center of an open, "set" trap, which prongs are fixedly connected to a sleeve rotatably connected to one of the ends of one of the frames of the trap. A bar is rotatably mounted on the second frame on the end opposite the first sleeve bar, and when the trap is in the set position, has a notch therein adapted to releasable fit over the first frame to a slot in the sleeve, and the bar thereby releasably holds the trap frames in an open "set" condition against the bars of the actuator. When prongs are moved, for example, by an animal passing through the open "set" trap, they rotate the sleeve and the bar is thereby dislodged permitting the trap to close; other notches, spaced along the bar, permit the adjusting of the pressure as desired. The trigger mechanism of the above-identified patent to Lehn suffers from disadvantages in that the two prongs projecting into the center of the trap act as a deterrent to animals passing through the trap since animals dislike pushing or brushing against projections because it makes noise and may damage their fur. Of course, the noise-creating feature is undesirable, since the animals will immediately react to the noise since it may warn their enemies or prey of their presence. Further, a two-prong trigger is not effective for all animals; for example, relatively large animals might push against the prongs and spring the trap before the animal gets very far into the trap and accordingly the trap would be ineffective. Additionally, relatively small animals might slide around the ends of the prongs and thereby move through the trap without actuating the trap. Other disadvantages of trap-trigger mechanism occur since this type of mechanism is subject to freezing due, for example, to moisture or rust impacting the relatively tight fit of the sleeve and the bar on the respective sides of the trap. Thus, the traps, at times, are ineffective. Moreover, when a rotating frame trap having large actuator springs, for strong initial striking power of the jaws, is used, the moving parts of the trigger mechanism have a tendency to bite into each other because of the extreme pressure present when the trap is "set", thus making it difficult to release the trap. However, prongs of a length too great to be practical, would be required to afford the necessary leverage to release the trap and overcome this problem. Various types of lever mechanisms or trigger mechanisms are also used on rotating traps in addition to that of the U.S. Pat. No. to Conibear 3,010,245, and the Lehn U.S. Pat. No. 2,947,107 patent. For example, the additional prior art, of which the applicant is aware and believes to be pertinent, is as follows:

Olson, U.S. Pat. No. 879,668;
Conibear, U.S. Pat. No. 2,068,656;
Taylor, U.S. Pat. No. 2,333,828;
Oberto, U.S. Pat. No. 2,741,065;
Glass et al., U.S. Pat. No. 3,120,958;
Conibear, U.S. Pat. No. 3,797,162;
Benz, U.S. Pat. No. 3,855,724.

The present invention, as well as that of the above-identified application, provide in combination a rotating-frame type animal trap, a trigger assembly cooperating with such trap and defining an animal "run" to substantially ensure that the animal will be disposed in a vulnerable position with respect to the trap jaws or the transverse ends of the trap when the trap is "sprung".

The traps of the character involved, in addition to a novel trigger assembly which define an animal "run", are particularly adapted for use with conventional "Conibear" rotating-frame type animal traps, or those of comparable character, and thus the so-called "conventional 'Conibear'" traps can be readily converted to the type which defines an animal "run" so that the rotating-frame type trap has a greater versatility to both catch and hold the animal so that the animal is held in a relatively harmless position and condition, or the animal is killed in a relatively humane manner.

SUMMARY OF THE INVENTION

It is an object of the present invention to provide an improved treadle assembly for use in combination with a rotating-frame type animal trap in which the treadle assembly includes means defining a relatively large actuating-lever-area making the conventional rotatable-frame type trap even more versatile without loss of normal efficiency and effectiveness. More particularly, it is an object of the present invention to provide a novel treadle assembly for use in combination with a pivotal or rotatable frame-type trap of the generally identified "Conibear" type trap or the like, in which the treadle assembly incorporates a displaceable plate member defining actuating areas at opposite ends so that a slight impact or vertical force activates the trap from a "set" to a "closed" trapping condition.

More particularly, the novel treadle assembly as mentioned above, includes means for abuttingly engaging the "cocked" jaws of a rotatable-frame type trap, and the displaceable plate member includes at least one abutment edge means, spanning the "cocked" jaws of the trap but normally disposed below the plane of the "cocked" trap whereby pivotal, actuating-action of the treadle or displaceable plate member, causes the jaws to tilt with the displaceable plate member, resulting in abutment of one of the jaws off of the abutment means of the plate member so that the trap is actuated and the jaws are forcibly urged together toward an "uncocked" position.

A still further object of the invention comprises a novel treadle assembly used with a pivotal or rotating-frame type trap of the character mentioned above, in which a single treadle plate member defines two approaches and actuating lever portions of an animal "run" in which the lever can be modified to substantially induce the animal to enter the trap from the opposed approaches or on the "run" so that the animal is in its most vulnerable position when the animal causes the trap to be activated.

DESCRIPTION OF THE DRAWING

This together with other and more specific objects and advantages of the invention will become apparent when considered in detail with the following description of preferred embodiments when taken in conjunction with the drawing forming a part thereof, in which:

FIG. 1 is a perspective view of a novel treadle assembly, showing a fragmentary portion and the lower jaws of a rotatable-frame type trap in a "cocked" condition and retained in this condition on the treadle assembly for subsequent actuation by an animal;

FIG. 2 is a vertical section taken substantially on the plane of line 2—2 of FIG. 1;

FIG. 3 is a view similar to FIG. 2, showing one treadle lever portion of the trap in an actuated condition and illustrating somewhat schematically how the lower bar elements of the rotating-frame trap jaws forcibly move off of the abutment means of the treadle assembly;

FIG. 4 is an exploded perspective view of the treadle assembly, with portions broken away for purposes of clarity; and FIG. 5 is a vertical elevation of a portion of the novel treadle assembly showing an embodiment of the fulcrum means.

DESCRIPTION OF THE PREFERRED EMBODIMENT

Various positional-directional terms such as "off", "down", "horizontal", "vertical", etc., are merely used for purposes of description and to assist in describing the invention, and are not intended to restrict or imply restrictions in the operation, scope, or details of the invention.

Additionally, applicant incorporates by reference detailed descriptions of a typical rotating-frame type trap of the U.S. Pat. No. to Conibear No. 3,010,245, for example, and will describe the present invention in relation to details of this prior art typical rotating-frame type trap so that the structure and function will be readily understood in relation to the novel treadle assembly combination, or the treadle assembly per se will be readily understandable to those skilled in the art, and those familiar with the "Conibear" rotating-frame type traps.

Referring first to FIG. 1, the fragmentarily-shown rotating-frame type trap is indicated generally at 10 and comprises pivotal frames 12 and 14 which are connected by opposed pivot pins 16. The frame 12 includes integral lower and upper side legs 18 and 20 while the frame 14 includes lower and upper side legs 22 and 24. The legs 18 are integral with a transverse jaw bar 26 while the legs 22 are integral with a similar transverse jaw bar at 28. The jaw bars 26 and 28 at the upper ends of the legs 20 and 24 are substantial duplicates of the jaw bars illustrated, and are clearly disclosed in the U.S. Pat. No. to Conibear 3,010,245, mentioned above. Likewise, an actuator spring is operatively connected to the side legs of the rotating-frame type trap 10, and the trap is shown in FIG. 1 as being in a "cocked" condition in which the legs 26 and 28 are retained adjacent and parallel to each other against the force of the actuating spring of the trap 10. As shown schematically in FIG. 3, if the rotating-jaw trap 10 were "cocked", i.e., the jaws 26 and 28 disattached from the treadle assembly, the jaws would immediately pivot as illustrated in FIG. 3 due to the force of the actuating spring, and since there are upper pairs of jaw bars 26 and 28, these jaw bars would be urged toward each other and sweeping forwardly from the pivot elements 16 would trap the animal which has stepped onto the treadle assembly as will subsequently be described, and it should be familiar to those skilled in the art and familiar with rotating-frame type animal traps.

Referring to FIGS. 1, 2 and 4, the improved treadle assembly is indicated generally at 30 and comprises a relatively planar base plate 32 which can be rectangular, as shown, square, round, etc. The base plate incorporates diametrically opposed fulcrum means indicated generally at 36, and the cooperating portion thereof comprises, at the side edges 34 of the base plate, vertically projecting pivot ear elements 38. The pivot ear elements are transversely apertured at 40; see FIG. 4, and will receive therethrough axle means comprising a screw 42, which cooperates with suitable washer 44 and is engaged by a retention nut or fastener 46.

Secured by welding, brazing or the like on the upper surface 48 of the base plate 32 is suitable fixed abutment means which can comprise one or more vertically-projecting abutment plates. In this instance, two abutment plates 50 are secured at their lower edges 52 by welding. These plates extend longitudinally toward the opposite edges 54 and 56 of the base plate, and these edges generally define the opposite animal-runs, i.e., the approaches from which an animal can be trapped. The abutment plates 50 extend transversely of the pivot or fulcrum axis defined by the apertures 40 of the ear elements at 38. The abutment plates 50 have upper abutment edges 58 which function to actuate the rotating-frame type trap 10 as will be described in detail with respect to the operation of the trap.

Indicated generally at 60 is a one-piece treadle lever element which comprises, in the preferred embodiment, a rectangular planar element having depending from opposite side edges 62 transversely apertured pivot ear elements 64, whose aperture 66, when aligned with the apertures 40 of the ear elements 38 will receive the pivot screw 42 therethrough. The treadle-lever element 60 comprises the one-piece element 68 which has formed transversely therethrough elongated slots 70 which will be aligned with the upper edges 58; see FIG. 1, but the upper edge 58 will be disposed slightly below the upper surface of the element 68 when the trap is in its "cocked" condition as seen in FIG. 1. Suitably secured in flanking relationship at opposite sides, i.e., either outwardly or inwardly of the slots 70, are pairs of abutment pins 72 and 74. These pins can take on any suitable character, but are preferably cylindrical and could be mounted by swaging, screws protruding into suitable tapped portions through the bottom of the plate element 68, etc. The plate element 68 is slightly longer than the base plate element 32 and the opposite edges or ends 76 and 78 will be downwardly radiused and project beyond the edges 54 and 56 of the base plate and thus prevent foreign matter from generally becoming impacted between the inner opposed surfaces of the plate 38 and element 68 so that the trap when "set" as illustrated in FIG. 2 is free to function in the manner illustrated in FIG. 3.

OPERATION

After the rotating-frame type trap 10 has been "cocked", i.e., the jaw bars 26 and 28 are disposed substantially parallel against the force of an actuating spring (not shown), the jaw bars are positioned in the upper surface of the treadle lever plate element 68 inwardly of the respective abutment pins 72 and 74 as shown in FIGS. 1 and 2. At this time, the jaw bars extend transversely of the slots 70 at intermediate portions thereof, and the plate element 68 is retained in a substantially horizontal position as most clearly seen in FIG. 2.

As seen in FIGS. 2 and 3, if an animal approaches the trap from edge 56, and applies a downward pressure at A as illustrated by the direction arrow, and assuming the animal is sufficiently heavy to activate the trap, the treadle lever or element 68 will be pivoted about the fulcrum means 36, i.e., the pivot axis defined by the screw elements 42, and the plate 68 and the jaw bars 28 and 26 will tilt with the trap until the upper edge 58 of the abutment plates 50 project beyond the upper surface of the treadle-lever element 68. This position of the parts is clearly seen in FIG. 3 wherein the left-hand portion of the upper edge 58 abuts the jaw bar 28 and causes it to move off of the abutment pins 72. When this occurs, the actuator spring of the rotating-frame type trap causes the jaw 14 to pivot to the left as indicated by the dotted direction arrow, and at the same time the relief of force on the left-hand side of the pivot pin 42, causes the other portion of the treadle-lever to move downwardly and release the jaw bar 26, resulting in the trap jaw 12 moving in rightward direction. As previously mentioned, the rotating-jaw type trap will have similar jaw bars, not shown, which will cooperate with those shown and the trap is actuated to trap an animal A between the jaw bar 28 and the upper jaw bar connected to side arms 20.

Obviously, if the animal approaches from edge 54, i.e., and applies an actuating force as illustrated by phantom arrow B, the treadle-lever element 68 will assume the position fragmentarily shown on phantom lines at 68 in FIG. 3, and actuation of the "cocked" rotating-frame type trap will occur in a similar manner and thus the one-piece treadle-lever assembly 60 provides trapping of animals from two different approaches.

The element 68, if preferred, may have the triangular corners 68' removed and this will possibly induce the animal to step more centrally onto the trap, and thus assure that the animal's head may be centrally located with respect to the trap jaw-bars 28 and 26.

Additionally, as previously mentioned, instead of utilizing two abutment plates 50 as shown, if a sufficiently broad single plate is secured to the upper surface of the base plate 32 as indicted by phantom lines at 50 in FIG. 1, it could be possible to actuate the "cocked" rotating-jaw type trap, and thus the expedient of body single abutment means is to be considered within the purview of the present invention. Likewise, the pivot screw elements 42 could be replaced by a single screw that extends the entire width of the base plate 34 and through suitable aperture portions, not shown, in the abutment plates 50 or the single abutment plate of the character mentioned above. Likewise, the fulcrum means is illustrated as comprising cooperating pairs of overlapping, transversely-apertured ear elements, however, any suitable fulcrum means of the functional eqivalent of that illustrated at 36 could likewise be incorporated in the novel treadle assembly 30.

Referring to FIG. 5, another embodiment of fulcrum means 36 is shown. In this embodiment, fulcrum means 36 comprises screw 80 passing through pivot ear element 38, friction means 82 and pivot ear element 64, and wing nut 84. Optionally, coil spring 86 may be provided. The purpose of this embodiment will become manifest when consideration is given to the fact that non-target species such as birds may alight on the treadle which, without any sensitivity adjustment would then trigger the trap. Thus, the wing nut 84 can be tightened on screw 80 to the desired degree, to compress friction means 82 between pivot ear elements 38 and 64 thereby lowering the sensitivity of the treadle assembly 30 so that animals smaller than the target species will not trigger the trap. In a preferred embodiment of the adjustable fulcrum means, spring 86 is provided to make the adjustment infinitely variable and easier to manipulate in the field. The spring 86 is shown between wing nut 84 and pivot ear element 64. It could, alternatively, be between the head of screw 80 and pivot ear element 38. Friction means 82 is, for example, a leather or felt washer.

Accordingly, within the scope of the invention, and as mentioned in the summary thereof, there has been disclosed and described a novel treadle assembly which cooperates with rotating-frame type animal traps, accordingly providing a versatile and highly utilitarian trap which will enable the user to trap animals in a ready and expeditious, as well as humane manner. Additionally, the treadle-assembly permits use of rotating-frame type traps in their conventional manner, i.e., without a treadle assembly defining animal "runs" and in combination with the rotating-frame type traps of the "Conibear" type, they add a degree of versatility to this type trap which heretofore was not particularly appreciated other than the earlier filed application Ser. No. 615,672, filed Sept. 22, 1975 and of which the applicant is a co-inventor.

What is claimed is:

1. A treadle assembly for use in combination with a rotating frame type in which pairs of opposed jaw bars are disposed in adjacent relationship when the trap is cocked and in which the jaw bars are forcibly urged toward each other when the trap is uncocked, comprising base means for resting on a support surface and including portions for defining opposite runs from which animals to be trapped may approach the trap; treadle-lever means comprising a generally plate-like element overlying said base means and normally spaced thereabove; fulcrum means between said base and treadle-lever means defining above said base means a pivot axis for said treadle lever means transversely between the portions defining the opposite runs for the animals, said treadle-lever means comprising opposite operating-lever portions for the treadle assembly, said base means having vertically-extending abutment means thereon extending toward said operating-lever portions for dislodging at least one jaw bar of a cocked trap off the treadle-lever means when the trap is actuated, said treadle-lever means including orienting means for opposed jaw bars of the cocked rotating-frame type trap for retaining the trap jaws in a cocked condition until the vertically-extending abutment means dislodges the one jaw bar off the orienting means when the trap is actuated.

2. The structure as claimed in claim 1 in which said plate-like element comprises a single plate and the plate has transversely extending therethrough at least one opening at which said vertically-extending abutment means is exposed when the trap is cocked, said abutment means projecting above the upper surface of the treadle lever plate when one or the other lever portions of said treadle-lever means are depressed about the pivot axis.

3. The structure as claimed in claim 2 in which said vertically-extending abutment means comprises at least one elongated plate fixed to the upper surface of said base plate means and extending longitudinally in the direction of the opposite runs of the trap, said opening surrounding and exposing the upper edge of said elongated plate, said orienting means defining a linear area intersecting said opening at spaced portions and within which the jaws of the cocked trap are positioned.

4. The structure as claimed in claim 1 in which said vertically-extending abutment means comprises a pair of plate elements extending in the direction of the opposite animal runs and having upper abutment edges, said treadle-lever means comprising transverse slots through which the upper edges or the respective plates are exposed and can pass when the treadle-lever means pivot about its pivot axis, said orienting means defining a linear area at which respective opposed jaw bars of the cocked trap are disposed, said linear areas intersecting spaced portions of said slots so that pivoting of the treadle-lever means causes at least one jaw bar to be dislodged when the trap is actuated.

5. The structure as claimed in claim 1 in which said orienting means comprises spaced abutment pin elements projecting vertically from the treadle-lever portions and disposed intermediately of the respective treadle-lever portions and defining a linear area on the treadle-lever portions at which each jaw bar will be positioned over the vertically-extending abutment means.

6. The structure as claimed in claim 1 in which said fulcrum means comprises pairs of apertured ear elements integral with the respective base and treadle-lever means, the ear elements being overlapped and having a transverse pivot pin therethrough.

7. The structure as claimed in claim 6, wherein said pivot pin is a screw means and said fulcrum means further comprises friction means between said overlapped ear elements, and easily adjustable tightening means cooperating with said screw means.

8. The structure as claimed in claim 7, further comprising biasing means associated with said fulcrum means for adjusting the sensitivity of the treadle assembly.

* * * * *